(12) United States Patent
Mrozinski et al.

(10) Patent No.: US 6,858,290 B2
(45) Date of Patent: Feb. 22, 2005

(54) FLUID REPELLENT MICROPOROUS MATERIALS

(75) Inventors: James S. Mrozinski, Oakdale, MN (US); Chetan P. Jariwala, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 153 days.

(21) Appl. No.: 10/159,752

(22) Filed: May 29, 2002

(65) Prior Publication Data

US 2003/0228459 A1 Dec. 11, 2003

(51) Int. Cl.$^7$ .......................... B32B 3/26; C08L 27/12; C08K 5/09; A01N 25/34
(52) U.S. Cl. ................ 428/304.4; 428/315.5; 428/315.9; 428/221; 428/357; 428/364; 428/365; 428/395; 525/165; 525/178; 525/199; 525/200; 524/95; 524/319; 524/425; 524/451; 524/445; 524/449; 524/462; 424/402
(58) Field of Search .................. 428/315.5, 304.4, 428/315.9, 221, 357, 364, 365, 395; 424/402; 524/95, 425, 451, 445, 449; 525/165, 178, 199, 200

(56) References Cited

U.S. PATENT DOCUMENTS

| | | |
|---|---|---|
| 3,429,754 A | 2/1969 | Bierenbaum et al. |
| 3,565,985 A | 2/1971 | Schrenk et al. |
| 3,770,537 A | 11/1973 | Elton |
| 3,856,005 A | 12/1974 | Sislian |
| 3,911,499 A | 10/1975 | Benevento et al. |
| 4,247,498 A | 1/1981 | Castro |
| 4,419,993 A | 12/1983 | Petersen |
| 4,515,941 A | 5/1985 | Fujiwara et al. |
| 4,539,256 A | 9/1985 | Shipman |
| 4,726,989 A | 2/1988 | Mrozinski |
| 4,845,779 A | 7/1989 | Wheeler et al. |
| 4,867,881 A | 9/1989 | Kinzer |
| 4,920,960 A | 5/1990 | Hubbard et al. |
| 4,976,274 A | 12/1990 | Hanssen |
| 5,025,052 A | 6/1991 | Crater et al. |
| 5,145,727 A | 9/1992 | Potts et al. |
| 5,260,360 A | 11/1993 | Mrozinski et al. |
| 5,352,513 A | 10/1994 | Mrozinski et al. |
| 5,389,325 A | 2/1995 | Bookbinder et al. |
| 5,403,483 A | 4/1995 | Hayashida et al. |
| 5,427,842 A | 6/1995 | Bland et al. |
| 5,589,122 A | 12/1996 | Leonard et al. |
| 5,599,602 A | 2/1997 | Leonard et al. |
| 5,660,922 A | 8/1997 | Herridge et al. |
| 5,688,884 A | 11/1997 | Baker et al. |
| 5,690,949 A | 11/1997 | Weimer et al. |
| 5,738,111 A | 4/1998 | Weimer et al. |
| 5,935,370 A | 8/1999 | Weimer et al. |
| 5,981,038 A | 11/1999 | Weimer et al. |
| 5,989,698 A | 11/1999 | Mrozinski et al. |
| 6,106,956 A | 8/2000 | Heyn et al. |
| 6,111,696 A | 8/2000 | Allen et al. |
| 6,127,485 A | 10/2000 | Klun et al. |
| 6,171,689 B1 | 1/2001 | Kaytor et al. |
| 2001/0008652 A1 | 7/2001 | Hanada et al. |

FOREIGN PATENT DOCUMENTS

| | | |
|---|---|---|
| EP | 0 581 168 A1 | 2/1994 |
| EP | 0 994 089 A1 | 4/2000 |
| GB | 2 232 905 A | 1/1991 |
| JP | 02047031 | 2/1990 |
| JP | 06107845 | 4/1994 |
| WO | WO 95/17699 | 6/1995 |

OTHER PUBLICATIONS

"Organofluorine Chemicals and their Industrial Applications", edited by R. E. Banks, Ellis Horwood Ltd., (1979), p. 56.
J. O. Hendrichs, Industrial and Engineering Chemistry, (Jan. 1953), p. 103, vol. 45.
M. K. Bernett, Journal of Physical Chemistry, (1959), p. 1912, vol. 63.
N. O. Brace, "Long Chain Alkanoic and Alkenoic Acids with Perfluoroalkyl Terminal Segments", Journal of Organic Chemistry, (Nov.—Dec. 1962), p.4491–4498, vol. 27.
W. A. Zisman, "Contact Angle, Wettability, and Adhesion", Advances in Chemistry Series 43, (1964), p.22.
"Preparation, Properties, and Industrial Applications of Organofluorine Compounds", edited by R. E. Banks, Ellis Horwood Ltd., (1982), p. 26.

*Primary Examiner*—Terrel Morris
*Assistant Examiner*—Victor Chang
(74) *Attorney, Agent, or Firm*—Kent S. Kokko

(57) ABSTRACT

Microporous articles formed by thermally induced phase separation from a diluent in combination with a thermoplastic polymer and a fluorochemical additive providing novel fluid repellent articles. Such articles are useful in clothing, barrier membranes, optical films in electronic devices (such as light reflective and dispersive films), and protective garments.

31 Claims, No Drawings

FLUID REPELLENT MICROPOROUS MATERIALS

FIELD OF THE INVENTION

The present invention relates to fluid repellent microporous articles (e.g., films, sheets or membranes) formed from a polymer, diluent composition and fluorochemical in which the diluent is phase separated from a thermoplastic polymer to make the microporous article.

BACKGROUND OF THE INVENTION

Microporous films, sheets or membranes have a structure that enables fluids to flow through them. The effective pore size is at least several times the mean free path of the flowing molecules, namely, from several micrometers down to about 100 Angstroms. Such sheets are generally opaque, even when made from an originally transparent material, because the surfaces and internal structure scatter visible light.

Microporous membranes or films have been utilized in a wide variety of applications, such as the filtration of solids, the ultrafiltration of colloidal matter, diffusion barriers or separators in electrochemical cells, in the preparation of synthetic leather, and in the preparation of fabric laminates. The latter utilities require the membranes to be permeable to water vapor but not liquid water when preparing such articles as shoes, raincoats, outer wear, camping equipment such as tents, and the like. Moreover, microporous membranes or films are utilized for filtration of antibiotics, beer, oils, bacteriological broths, as well as for the analysis of air, microbiological samples, intravenous fluids, vaccines, and the like. Microporous membranes or films are also utilized in the preparation of surgical dressings, bandages, and in other fluid transmissive medical applications.

Microporous membranes or films may be laminated to other articles to make laminates having particular utility. Such laminates may include a microporous layer and an outer shell layer to provide a particularly useful garment material. Further, the microporous films or membranes may be utilized as a tape backing to provide such products as vapor transmissive wound dressings or hair setting tapes.

The art is replete with various methods of producing microporous materials. One useful technology found is thermally induced phase separation (TIPS). The TIPS process is based on the use of a polymer that is soluble in a diluent at an elevated temperature and insoluble in the diluent at a relatively lower temperature. The "phase separation" can involve a solid-liquid phase separation, or a liquid-liquid phase separation. This technology has been employed in the preparation of microporous materials wherein thermoplastic polymer and a diluent are separated by a liquid-liquid phase separation as described in U.S. Pat. Nos. 4,247,498 and 4,867,881. A solid-liquid phase separation has been described in U.S. Pat. No. 4,539,256 wherein the thermoplastic polymer on cooling crystallizes out. The use of nucleating agents incorporated in the microporous material is also described as an improvement in the solid-liquid phase separation method, U.S. Pat. No. 4,726,989.

U.S. Pat. No. 5,260,360 (Mrozinski et al.) describes a liquid repellent, moisture vapor and air permeable, microporous membrane materials which comprise an oleophobic, hydrophobic, moisture vapor and air permeable, sweat contamination resistant, heat sealable, microporous membrane material comprising a crystallizable olefin polymer, a processing compound which is miscible with the olefin polymer at the polymer's melting point but phase separates on cooling to or below the crystallization temperature of the polymer, and a fluorochemical oil and water repellent compound which is generally solid at room temperature, preferably a fluorochemical oxazolidinone compound, said material being oriented in at least one direction.

U.S. Pat. No. 5,690,949 (Weimer et al.) discloses a method of preventing transmission of viral pathogens between a source of viral pathogens and a target of said viral pathogens comprising positioning between said source and said target a microporous membrane material comprising (1) a thermoplastic polymer or polytetrafluoroethylene and (2) a water- and oil-repellent fluorochemical compound which provides said membrane with oleophobic, hydrophobic and viral barrier properties.

SUMMARY OF THE INVENTION

The present invention provides an oriented, fluid repellent microporous polymeric materials, prepared by a solid-liquid phase separation process, which contain an integral fluorochemical additive.

The microporous membrane materials of the present invention retain their liquid repellency and moisture vapor permeability properties for extended periods even in garment applications, which expose the membrane materials to perspiration residues that are known to often contaminate and ultimately destroy repellency properties of most conventional fluid repellent, moisture, vapor permeable materials. Surprisingly, the materials of the invention retain this contamination resistance to perspiration despite the presence of an oleophilic diluent component. Further, the microporous membrane materials useful in the invention repel mineral oil even when they contain mineral oil. The microporous membrane materials of the present invention also possess excellent hand, drape and heat sealability.

The present invention further relates to a microporous membrane and a method of preventing transmission of viral pathogens between a source of viral pathogens and a target of said viral pathogens comprising positioning between said source and said target a microporous membrane material comprising (1) a crystallizable thermoplastic polymer, (2) a diluent and (3) a water- and oil-repellent fluorochemical additive which provides said membrane with oleophobic, hydrophobic and viral barrier properties. The fluorochemical additive may be introduced as a melt additive during the membrane preparation. The membrane material is moisture vapor, air permeable and sweat contamination resistant. The membrane material is also heat sealable when made using a thermoplastic polymer.

Accordingly, the present invention provides an oriented microporous material containing a crystallizable polymer component, a diluent, and a fluorochemical additive of the formula:

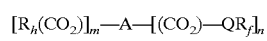

$[R_h(CO_2)]_m$—A—$[(CO_2)$—$QR_f]_n$ wherein A is the residue of a polyol, polyacid or mixed hydroxy acid, optionally having one or more unreacted hydroxyl or carboxyl functional groups, having 3 to 12, preferably 3 to 6 carbon atoms, $R_h$ is an alkyl group of 12 to 72 carbon atoms, $R_f$ is a fluoroalkyl group or 3 to 12 carbon atoms, Q is a divalent linking group, each $(CO_2)$ group is non-directional, and m and n are each at least 1.

More specifically, the present invention provides a microporous material including:

(a) about 40 to 80, preferably 65 to 80 parts by weight of a polymer component, (b) about 20 to 60, preferably 25 to 60, most preferably 35 to 60 parts by weight of a diluent component, the diluent component being miscible with the polymer component at a temperature above the liquid-solid phase separation temperature, the diluent component able to phase separate from the polymer component through crystallization separation upon cooling below the liquid-solid phase separation temperature; and (c) about at least 0.5, preferably 1 to 10, most preferably 1 to 5 parts by weight of the fluorochemical additive.

A second aspect of the present invention is a method of making a microporous article including the steps of:

(a) melt-blending to form a solution comprising about 40 to 80, preferably 65 to 80 parts by weight of a crystallizable thermoplastic polymer component, about 20 to 60, preferably 25 to 60, most preferably 35 to 60 parts by weight of an diluent component that is miscible with the polymer component at a temperature above the liquid-solid phase separation temperature, and about at least 0.5, preferably 1 to 10 parts by weight of a fluorochemical additive;

(b) forming a shaped article of the melt-blended solution, (c) cooling said shaped article to a temperature at which phase transition occurs between said diluent and said polymer component through crystallization precipitation of the polymer component to form a network of polymer domains, and (d) creating porosity by stretching said article at least in one direction to separate adjacent crystallized polymer domains from one another to provide a network of polymer spherulites connected by fibrils.

A third aspect of the present invention is a multilayer microporous film containing at least one layer of a microporous material as described above.

The article formed from liquid-solid phase separation, before orientation, is solid and generally transparent comprising an aggregate of a first phase of spherulites of crystallized thermoplastic polymer and a second phase of the diluent component. The fluorochemical additive may be dissolved in the polymer component and/or the diluent component or may form a third phase of fluorochemical additive dispersed in the matrix as a solid or liquid. Extraction of the diluent component indicates that the fluorochemical additive is dissolved or dispersed in the diluent component rather than the polymer component. The polymer domains may be described as spherulites and aggregates of spherulites of the polymer. Adjacent domains of polymer are distinct but they have a plurality of zones of continuity. That is, the polymer domains are generally surrounded or coated by the diluent component and/or the fluorochemical additive, but not completely. There are areas of contact between adjacent polymer domains where phase separation has not occurred and there is a continuum of polymer from one domain to the next adjacent domain in such zones of continuity.

On orienting or stretching, the polymer domains are pulled apart, permanently attenuating the polymer in the zones of continuity thereby forming fibrils that interconnect the polymer spherulites, and forming minute voids between coated particles, creating a network of interconnected micropores, thereby rendering the article permanently translucent. On orienting or stretching, the diluent component and fluorochemical additive component remains coated on or surrounds, at least partially, the surfaces of the resultant thermoplastic polymer domains. The degree of coating depends upon the affinity of the compound for the surface of the polymer domain, whether the compound is a liquid or solid, whether orientation dislodges or disrupts the coating and on other factors which may be relevant. The domains are usually at least partially coated after orientation.

Substantially all of the domains appear to be connected by fibrils. The size of the micropores is controlled by varying the degree of stretching, percent of diluent and fluorochemical additive component, melt-quench conditions, nucleating agent (if present) and heat-stabilization procedures. The fibrils for the most part do not appear to be broken by stretching but they are permanently stretched beyond their elastic limit so that they do not elastically recover to their original position when the stretching force is released. As used herein, "orienting" and "oriented" means such stretching beyond the elastic limit so as to introduce permanent set or elongation of the article.

The microporous article may comprise a single microporous layer, or may comprise a multilayer article having at least one microporous layer as defined above. The article may include additional microporous layers, or additional nonporous layers, or one or more porous layers (such as a nonwoven layer) depending on the application and requirements. For example, the microporous article may comprise one or more microporous layers laminated or otherwise bonded to one or more nonporous film layers or one or more nonwoven layers.

The microporous articles of the invention may be used in many applications where repellency and moisture vapor permeability are desired. Repellency properties will include one or more of the following: water repellency, oil repellency, bodily fluids including blood, sweat, and urine, repellency of organic compounds including solvents, herbicides and pesticides. The article further remain moisture vapor and air permeable, but impermeable to bacterial and viral pathogens rendering it useful in the preparation of garments, including medical garments such as gowns and masks.

DETAILED DESCRIPTION

The microporous article of the present invention includes a crystallizable polymer component, and diluent component, and at least about 0.5 parts by weight of a fluorochemical additive.

As used herein, the term "microporous" refers to films, membranes or films layers having average pores size of 0.05 to 3.0 microns as measured by bubble point pore size ASTM-F-316-80.

As used herein, the term "polymer component" refers only to conventional polymers that are melt-processible under ordinary melt-processing conditions.

As used herein, the term "crystalline" with regard to polymer components includes polymers which are at least partially crystalline, preferably having a crystallinity of greater than 20 weight % as measured by Differential Scanning Calorimetry (DSC). Crystalline polymer structures in melt-processed polymers are known to those skilled in the art.

As used herein, the term "melting temperature" refers to the temperature at or above which a polymer component alone or in a blend with a diluent component will melt.

As used herein, the term "crystallization temperature" refers to the temperature at or below which a polymer component alone or in a blend with a diluent, will crystallize.

As used herein, the term "liquid-solid phase separation temperature" refers to the temperature at or below which a solution of a compatible polymer and diluent mixture, i.e., a homogeneous polymer diluent solution, phase separates by crystallization of the polymer component.

As used herein, the term "diluent component" refers to the diluent component in solid-liquid phase separation.

As used herein, the term "compatible mixture" refers to a fine dispersion of one polymer component (less than 1 micrometer particle size) in a continuous matrix of a second polymer component or a fine inter-penetrating network of both polymer components, and "compatible" refers to two or more polymers capable of forming such dispersions or interpenetrating networks with each other. Compatibility requires that at least one polymer component of a compatible mixture be at least partially miscible with the other polymer components.

As used herein, the term "oil-in" refers to a microporous film made by solid-liquid phase separation in which the diluent component is not removed.

As used herein, the term "oil-out" refers to a microporous film made by solid-liquid phase separation in which the oil component is essentially removed.

"Moisture vapor permeable" is used herein to describe microporous membrane materials which readily permit the passage of water vapor through the fabric but which do not allow the passage of liquid water.

The term repellent, as in "water repellent", "oil-repellent", "solvent-repellent", etc. is used herein to describe microporous membrane materials that are not fluid wettable and are capable of preventing the passage of fluid through the membrane material by capillary action under varying ambient atmospheric conditions, including fluid impinging on the surface of the membrane material.

The term "hydrophobic" is used herein to describe microporous membrane materials which are not wet by liquid water or aqueous body fluids such as blood, saliva, perspiration and urine, and which are capable of repelling and preventing the passage of liquid water through their structure.

The term "oleophobic" is used herein to describe microporous membrane materials that are not wet by oils, greases or body fluids, which contain oily components such as perspiration and are capable of preventing the passage of oils and greases through their structure.

The term "heat sealable" is used herein to describe microporous membrane materials that can be sealed together using a hot bar, ultrasonic, or other thermal process sealer to form a bond having a bond strength of at least 10 g/cm width.

The terms "acyl" or "carboxyl" as in "polyacyl" or "polycarboxyl" refers to compounds having at least 2 groups of the formula —C(O)—O— or derivatives thereof, such as esters, acyl halides or anhydrides, that may react with a hydroxyl group.

In general, the fluorochemical additives must generally form a homogeneous mixture (dispersion or solution) with the polymer and diluent components at the processing temperatures used, and preferably melt below the processing temperature. In order that the fluorochemical additive not weaken the structure of the ultimate article (such as a film or sheet), the additive should not inhibit the crystal nucleation of the polymer component during phase separation such that the microstructure grows so large as to adversely weaken the film.

Useful fluorochemical additives include compounds of the formula:

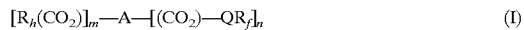

wherein A is the residue of a polyol, polyacid or mixed hydroxy acid, optionally having one or more unreacted hydroxyl or carboxyl functional groups having 3 to 12, preferably 3 to 6 carbon atoms;

$R_h$ is an alkyl group of 12 to 72 carbon atoms, $R_f$ is a fluoroalkyl group or 3 to 12 carbon atoms, Q is a divalent linking group, each ($CO_2$) group is non-directional, i.e. —O—C(O)— =—C(O)—O—, and m and n are each at least 1, preferably the sum of m+n is at least 3.

Where the fluorochemical additive is derived from a polyol, useful additives include compounds of the formula:

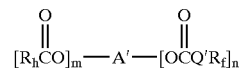

wherein A' is the residue of a polyol, optionally having one or more unreacted hydroxyl or carboxyl functional groups having 3 to 12, preferably 3 to 6 carbon atoms;

Q' is a divalent linking group, and $R_f$, $R_h$, n and m are as previously defined.

Where the fluorochemical additive is derived from a polyacid (or polyacyl compound), useful additives include compounds of the formula:

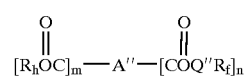

wherein A" is the residue of a polyacid optionally having one or more unreacted hydroxyl or carboxyl functional groups having 3 to 12, preferably 3 to 6 carbon atoms;

Q" is a divalent linking group, and $R_f$, $R_h$, n and m are as previously defined.

It will be understood with respect to Formulas I, II and III that mixtures of compounds may be present with different substitution patterns and degrees of substitution, and "m" and "n" are average values and may be non-integral, e.g. "m" may be a value of 1.6.

$R_f$ represents a perfluoroalkyl or perfluoroheteroalkyl group having from 3 to about 12 carbon atoms, preferably 3 to 8 carbon atoms, more preferably having from about 3 to about 5 carbon atoms; $R_f$ can contain straight chain, branched chain, or cyclic fluorinated alkylene groups or combinations thereof with straight chain, branched chain or cyclic alkylene groups; $R_f$ is preferably free of polymerizable olefinic unsaturation and can optionally contain catenary heteroatoms such as oxygen, divalent or hexavalent sulfur, or nitrogen; a fully fluorinated radical is preferred, but hydrogen or chlorine atoms may be present as substituents provided that not more than one atom of either is present for every two carbon atoms; the terminal portion of the $R_f$ group is fully fluorinated, preferably containing at least 7 fluorine atoms, e.g., $CF_3CF_2CF_2$—, $(CF_3)_2CF$—, —$CF_2SF_5$ or the like. Preferably, $R_f$ contains from about 40% to about 80% fluorine by weight, more preferably from about 50% to about 78% fluorine by weight; perfluorinated aliphatic groups (i.e., perfluoroalkyl groups of the formula $C_nF_{2n+1}$—) are the most preferred embodiments of $R_f$.

The $R_h$ moiety is derived from long-chain aliphatic monofunctional acids or alcohols having 12 to 72 carbons. Long-chain hydrocarbon groups typically have been known to impart poor oil repellency; however, the chemical compositions of the present invention comprising terminal long-chain hydrocarbon groups having 12 to 72 carbons impart good stain-release properties. Long-chain aliphatic monofunctional compounds suitable for use in the chemical compositions of the present invention comprise at least one, essentially unbranched, aliphatic alcohols and acids having from 12 to about 72 carbon atoms which may be saturated, unsaturated, or aromatic. These long-chain hydrocarbon alcohols or acids can be optionally substituted, for example, with groups such as one or more chlorine, bromine, trifluoromethyl, or phenyl groups. Representative long-chain hydrocarbon alcohols include 1-dodecanol, 1-tetradecanol, 1-hexadecanol, 1-octadecanol, and the like, and mixtures thereof. Representative long-chain hydrocarbon carboxylic acids (or functional derivatives thereof, such as esters) include 1-dodecanoic acid, 1-tetradecanoic acid, 1-hexadecanoic acid, 1-octadecanoic acid, and the like, and mixtures thereof. Preferred long-chain hydrocarbon alcohols or acids have 12 to 50 carbon atoms, with 18–40 carbon atoms being more preferred for performance.

With respect to Formulas I to III, the fluoroaliphatic group, $R_f$, is linked to the (—$CO_2$—) group by a linking group designated Q, Q' and Q" respectively. Linking groups Q, Q' and Q" can be a covalent bond, a heteroatom, e.g., O or S, or an organic moiety. The linking groups Q, Q' and Q" are preferably organic moieties containing 1 to about 20 carbon atoms, and optionally containing oxygen, nitrogen-, or sulfur-containing groups or a combination thereof, and preferably free of functional groups, e.g., polymerizable olefinic double bonds, thiols, easily abstracted hydrogen atoms such as cumyl hydrogens, and other such functionality known to those skilled in the art, that substantially interfere with the preparation of the fluorochemical additives. Examples of structures suitable for linking groups Q, Q' and Q" include straight chain, branched chain, or cyclic alkylene, arylene, aralkylene, oxy, oxo, thio, sulfonyl, sulfinyl, imino, sulfonamido, carboxamido, carbonyloxy, urethanylene, ureylene, and combinations thereof such as sulfonamidoalkylene.

Preferred linking groups Q, Q' and Q" can be selected according to ease of preparation and commercial availability. Below is a partial representative list of suitable organic Q' groups. For the purposes of this list, each k is independently an integer from 0 to about 20, $R_1'$ is hydrogen, phenyl, or alkyl of 1 to about 4 carbon atoms, and $R_2'$ is alkyl of 1 to about 20 carbon atoms. Each structure is non-directional, i.e. —$(CH_2)_kC(O)O$— is equivalent to —$O(O)C(CH_2)_k$—.

| | |
|---|---|
| —$SO_2NR_1'(CH_2)_kO(O)C$— | —$CONHR_1'(CH_2)_kO(O)C$— |
| —$(CH_2)_kO(O)C$— | —$CH_2CH(OR_2')CH_2O(O)C$— |
| —$(CH_2)_kC(O)O$— | —$(CH_2)_kSC(O)$— |
| —$(CH_2)_kO(CH_2)_kO(O)C$— | —$(CH_2)_kS(CH_2)_kO(O)C$— |
| —$(CH_2)_kSO_2(CH_2)_kO(O)C$— | —$(CH_2)_kS(CH_2)_kOC(O)$— |
| —$(CH_2)_kSO_2NR_1'(CH_2)_kO(O)C$— | —$(CH_2)_kSO_2$— |
| —$SO_2NR_1'(CH_2)_kO$— | —$SO_2NR_1'(CH_2)_k$— |
| —$(CH_2)_kO(CH_2)_kC(O)O$— | —$(CH_2)_kSO_2NR_1'(CH_2)_kC(O)O$— |
| —$(CH_2)_kSO_2(CH_2)_kC(O)O$— | —$CONR_1'(CH_2)_kC(O)O$— |
| —$(CH_2)_kS(CH_2)_kC(O)O$— | —$CH_2CH(OR_2')CH_2C(O)O$— |
| —$SO_2NR_1'(CH_2)_kC(O)O$— | —$(CH_2)_kO$— |
| —$(CH_2)_kNR_1'C(O)O$— | —$OC(O)NR'(CH_2)_k$— |

Preferably, Q' is —$SO_2N(R^1)R^2$—, —$(CH_2)_kO(CH_2)_kO(O)C$—, —$(CH_2)_kO$— or —$CONR_1'(CH_2)_kC(O)O$— where $R^1$ is a hydrogen or lower alkyl group, such as a $C_1$-$C_4$ alkyl group; and $R^2$ is an alkylene group or heteroalkylene group, preferably a $C_1$-$C_4$ alkylene group.

The A moiety is derived from a polyfunctional alcohol, acid (or derivative thereof, such as a ester, acyl halide or anhydride) or mixed hydroxy acids such as citric acid, having from 3 to 12, preferably 3 to 6 carbon atoms, and which may be further substituted by one of more unreacted hydroxy or carboxyl functional groups.

Thus, A' represents polyols which comprise from about 3 to about 12 carbon atoms and have at least two hydroxy groups that are primary or secondary (i.e., or at least two primary hydroxy groups, at least two secondary groups, or at least one primary group and at least one secondary group). A' which may be further substituted by one of more unreacted hydroxy or carboxyl functional groups. Preferably, the polyol comprises at least three hydroxy groups with at least one hydroxy group, preferably at least two hydroxy groups, being primary.

Examples of useful polyols include aliphatic or aromatic glycols, preferably alkylene glycols, such as 1,3-propanediol, 1,4-butanediol, 1,6-hexanediol, 1,4-cyclohexanedimethanol, 1,8-octanediol, and polyhydroxyalkanes, such as glycerol, trimethylolethane, trimethylolpropane, 1,2,6-trihydroxyhexane, pentaerythritol, and sorbitol, and blends thereof. Other examples of useful polyols are disclosed in U.S. Pat. No. 4,503,211 herein incorporated by reference. Examples of preferred polyols include 1,6-hexanediol, diethylene glycol, 1,5-pentanediol, 1,4-cyclohexanedimethanol, trimethylolpropane and blends thereof.

A" represents the residue of a polyfunctional acid (or functional derivative thereof) having from 3 to 12 carbon atoms, and which may be further substituted by one of more unreacted hydroxy or carboxyl functional groups. Thus, A' represents the residue of polyacids (or derivative thereof such as acid, ester, acyl halide or anhydride) which comprise from about 3 to about 12 carbon atoms and have at least two carboxyl groups, Examples of useful polyacids include malonic, succinic, fumaric, maleic, citraconic, aconitic, o-phthalic, trimesic acids adipic acid, suberic acid, azelaic acid, sebacic acid, phthalic acid, isophthalic acid, terephthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimerized and trimerized unsaturated fatty acids.

Polyfunctional compounds having both hydroxy and acid functional groups, such as citric acid, glycolic, lactic, beta-hydroxybutyric, gamma-hydroxybutyric, tartronic, malic, oxalacetic, tartaric, 2- or 3-hydroxypropionic acid), hydroxybutyric acids (e.g., 2-, 3 -, or 4-hydroxybutyric acid), hydroxyvaleric acids (e.g., 2-, 3 -4-, or 5-hydroxyvaleric acid), hydroxycaproic acids (e.g., 2-, 3-, 4-, 5-, or 6-hydroxycaproic acid), branched chain $C_3$-$C_6$ hydroxyalkyl carboxylic acids (e.g., 2-hydroxydimethylacetic acid), malic acid monoesters, and the like may also be used.

A particularly useful class of compounds are those derived from citric acid and may be represented by the formula:

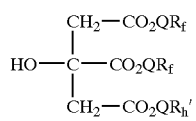

wherein $R_f$ and Q are as defined for Formula I, and $R_h{'}$ is an alkyl group having an average of 20 carbon atoms or greater. The free hydroxyl group may be further functionalized with an aliphatic or fluoroaliphatic acid. Such compounds are believed to be novel.

The most preferred embodiment are those derived from polyacyl compounds such as shown in Formula III wherein $R_f$ has 3 to 6 carbon atoms, n is at least 1.5, m+n is 3 and Q" is —$SO_2NR_1{'}(CH_2)_k$—, wherein k is from 2 to 11, and $R_1{'}$ is hydrogen, or alkyl of 1 to about 4 carbon atoms.

Unexpectedly, it has been found that the fluorochemical additives of the present invention, having $C_3$–$C_6$ fluoroalkyl groups, provide repellency and barrier properties comparable to those provided by higher fluoroalkyl radicals. Heretofore it has been believed that perfluoroalkyl groups having at least 8 carbon atoms were necessary for adequate performance, and the performance of lower perfluoroalkyl groups degraded with decreasing carbon number. Further, it has been found that only those fluorochemical additives having a —$SO_2NR_1{'}(CH_2)_k$—. linking group (as herein defined) maintained adequate performance with decreasing carbon chain, while the performance of those with other linking groups, e.g. —$C_nH_2$—, did degrade as expected.

Fluorochemical compositions have achieved widespread use in a variety of applications, including, for example, in oil- and/or water-repellent compositions, and in surfactant compositions. Some known fluorochemical compositions ultimately degrade to perfluorooctyl-containing compounds when exposed to biological, thermal, oxidative, hydrolytic and photolytic conditions found in the environment. It has been reported that certain perfluorooctyl-containing compounds ($C_8F_{17}$—) may tend to bio-accumulate in living organisms; this tendency has been cited as a potential concern regarding some fluorochemical compositions. For example, see U.S. Pat. No. 5,688,884 (Baker et al.). As a result, there is a desire for fluorine-containing compositions effective in providing desired functional properties, e.g., water- and oil-repellency, surfactant properties, etc. while eliminating more effectively from biological systems.

The performance of the present compositions are surprising in view of teachings that the lower perfluoroalkyl groups were significantly less effective than longer chain perfluoroalkyl groups, such as the perfluorooctyl group. For example, it has been demonstrated that surfactants derived from perfluorocarboxylic acids and perfluorosulfonic acids exhibit considerable differences in performance as a function of chain length. See, for example *Organofluorine Chemicals and their Industrial Applications*, edited by R. E. Banks, Ellis Horwood Ltd. (1979), p56; J. O. Hendrichs, *Ind. Eng Chem.*, 45, 1953, p103; M. K. Bernett and W. A. Zisman, *J. Phys. Chem.*, 63, 1959, p1912.

Further, various models have been devised to explain the low surface energies and resultant high contact angle data of fluorinated polymer coatings that are based on a monolayer of a fluorinated carboxylic or sulfonic acids present at the air/liquid interface. The data suggest that only after the seven outermost carbon atoms of the fluoroalkyl group ($C_7F_{15}$—) were fully fluorinated did the contact angles (and therefore the surface energies) of various liquids on the surface approach those of a perfluorinated acid monolayer (see N. O. Brace, *J. Org. Chem.*, 27, 1962, p 4491 and W. A. Zisman, *Advan. Chem*, 1964, p. 22.). Therefore, one would expect that the performance of fluorinated coatings containing fluoroalkyl groups (e.g., coatings made by polymerizing fluoroalkyl (meth)acrylates) could be predicted from the known performance of perfluorocarboxylic and perfluorosulfonic acid derivatives, and the surface energy of the fluoropolymer coatings would be related to the chain length of the fluoroalkyl group of the fluoropolymer coating.

The present treatment compositions provide additional advantages. First, the precursor compounds containing the shorter fluoroalkyl groups useful in the treatment compositions of the invention may be produced at a lower cost per weight because of higher yields while maintaining their potency as effective low surface energy coatings at the same weight basis. For example, the heptafluorobutyryl fluoride precursor may be prepared in yields of 60% as compared to perfluoro-octanoyl fluoride precursor (31%) in an electrochemical fluorination process (*Preparation, Properties, and Industrial Applications of Organofluorine Compounds*, edited by R. E. Banks, Ellis Horwood Ltd (1982), p 26). Furthermore, the short chain carboxylic acids (the presumed intermediate degradation products) are less toxic and less bioaccumulative than the longer chain homologues.

The fluorochemical additives are the reaction product of one or more aliphatic polyfunctional compounds having hydroxyl and/or acyl functional groups and 3 to 12, preferably 3 to 6 carbon atoms, one or more fluorochemical monofunctional compounds and one or more aliphatic monofunctional compounds having 12 to 72 carbon atoms. As one skilled in the art would understand, the order of the steps is non-limiting and can be modified so as to produce the desired additives.

In one useful synthesis, the aliphatic polyfunctional compound (polyol or polyacyl compound) and the fluorochemical monofunctional compound(s) are dissolved together under dry conditions, preferably in a solvent, and then heating the resulting solution at approximately 110 to 120° C., with optional mixing in the presence of a catalyst for 12 to 15 hours, with water removed by means of a Dean-Stark trap. Depending on reaction conditions (e.g., reaction temperature and/or reagents used), a catalyst level of up to about 1 percent by weight of the polyfunctional compound/fluorochemical monofunctional compound mixture may be used, but typically about 0.1 to about 1 percent by weight is preferred, 0.2 to 0.5 percent by weight being more preferred. If desired, the fluorochemical additive may be prepared in the absence of solvent, but higher temperatures are generally necessary.

The fluorochemical monofunctional compound is used in amounts sufficient to react with 25 to 75%, preferably at least 33% of the available functional groups of the polyfunctional compound (polyol or polyacyl compound). Generally the amount of fluorochemical monofunctional compound is used in amounts sufficient so that the fluorochemical additive comprises at least about 15 weight percent fluorine.

The reaction product may be further reacted with the monofunctional aliphatic compound; the aliphatic acid or the aliphatic acyl compound as previously described for the fluorochemical monofunctional compound. The aliphatic monofunctional compound is used in amounts sufficient to react with 25 to 75%, preferably at least 33% of the available functional groups of the polyfunctional compound (polyol or polyacyl compound). It is not necessary to completely react all the available functional groups of the polyfunctional aliphatic compound; one or more functional groups may remain unreacted.

It will be understood that the described reaction product will represent a mixture of compounds. With respect to Formulas I to III, the subscripts "m" and "n" therefore represent average values and may be a non-integral value.

Representative fluorochemical monofunctional compounds useful in forming the fluorochemical additive may be depicted by the formula:

$$R_fQZ,$$

wherein $R_f$ and Q are as previously defined, and Z represents a hydroxyl group or an acyl group which may react with the corresponding co-reactive acyl group and/or hydroxyl groups of the aliphatic polyfunctional compound to form the (—CO2—) linkage of Formulas I to III.

Representative aliphatic monofunctional compounds useful in forming the fluorochemical additive may be depicted by the formula:

$$R_hZ,$$

wherein $R_h$ is as previously defined, and Z represents a hydroxyl group or an acyl group which may react with the corresponding co-reactive acyl group and/or hydroxyl group of the aliphatic polyfunctional compound to form the (—CO2—) linkage of Formulas I to III.

Representative aliphatic polyfunctional compounds useful in forming the fluorochemical additive may be depicted by the formula:

$$AZ'_x,$$

wherein A is as previously defined, Z' represents a hydroxyl group or an acyl group (or functional derivative thereof such as an acy group, ester group or anhydride group) which may react with the corresponding co-reactive acyl group and/or hydroxyl groups of the aliphatic monofunctional compound and the fluorochemical monofunctional compound to form the (—CO2—) linkages of Formulas I to III, and x is a number equal to or greater than the sum of m plus n with respect to the Formulas I to III.

The fluorochemical additives are generally incorporated into the microporous article by addition of the additive(s) to the melt prior to film formation. The fluorochemical additives may be added neat, or incorporated into the diluent or polymer. Care should be exercised to choose an additive that is stable at the melt temperature of the polymer. Additives are added in sufficient amounts to render the microporous article more oil- an/or water-repellent relative to the microporous article lacking the fluorochemical additive. Typically the fluorochemical additives are added in amounts of at least 0.5, preferably 1 to 10 parts by weight. More preferably the additives are added to the polymer/processing compound mixture in the proportion of 1 to 5 parts by weight. The additives can be added to the membranes of the present invention in amounts greater than 10 parts by weight, but additions in excess of about 5 parts by weight typically do not show any performance advantages.

Preferably the diluent is retained in the microporous article due to cost considerations. If not removed, the "oil-in" microporous article contains greater than 20 parts by weight diluent (preferably 25 to 60 parts by weight) diluent. Oil-out microporous articles typically contain less that ten parts by weight of diluent after oil removal. Generally however, an oil-out article is not desired, as the fluorochemical additive is frequently dissolved in the diluent phase.

Crystallizable polymers suitable for use in the preparation of microporous materials of the invention are well known and readily commercially available. The useful polymers are melt processable under conventional processing conditions. That is, on heating they will easily soften and/or melt to permit processing in conventional equipment such as an extruder to form a sheet. Crystallizable polymers, upon cooling their melt under controlled conditions, spontaneously form geometrically regular and ordered chemical structures. Preferred crystallizable polymers for use in the present invention have a high degree of crystallinity and also possess a tensile strength of at least about 70 kg/cm$^2$ (1000 psi).

Crystallizable olefin polymers suitable for use in the preparation of microporous membrane materials useful in the present invention are melt processable under conventional processing conditions. That is, on heating, they will easily soften and/or melt to permit processing in conventional equipment, such as an extruder, to form a sheet, film, tube, filament or hollow fiber. Upon cooling the melt under controlled conditions, suitable polymers spontaneously form geometrically regular and ordered crystalline structures. Preferred crystallizable polymers for use in the present invention have a high degree of crystallinity and also possess a tensile strength of at least about 70 kg/cm$^2$ (1000 psi).

Examples of commercially available suitable crystallizable polyolefins include polypropylene, block copolymers or copolymers of ethylene and propylene, or other copolymers, such as polyethylene, polypropylene and polybutylene copolymers, which can be used singularly or in a mixture.

If desired, a nucleating agent may be used. The nucleating agent employed in the present invention may serve the important functions of inducing crystallization of the polymer from the liquid state and enhancing the initiation of polymer crystallization sites so as to hasten the crystallization of the polymer. Because the nucleating agent serves to increase the rate of crystallization of the polymer, the size of the resultant polymer particles or spherulites is reduced. The use of nucleating agents in the preparation of microporous materials has been described in U.S. Pat. No. 4,726,989 (Mrozinski). Generally nucleating agents, if present, are used in amounts of 0.05 to 5 parts by weight, relative to polymer, diluent and fluorochemical additive.

Some examples of nucleating agents which have been found useful for purposes of the present invention include aryl alkanoic acid compounds, benzoic acid compounds, and certain dicarboxylic acid compounds and certain pigments. In particular, the following specific nucleating agents have been found useful: dibenzylidine sorbitol, titanium dioxide (TiO$_2$), talc, adipic acid, benzoic acid, azo red pigment, green and blue phthalocyanine pigments, and fine metal particles. It will be understood that the foregoing nucleating agents are given by way of example only, and that the foregoing list is not intended to be comprehensive. Other nucleating agents that may be used in connection with thermoplastic polymers are well known, and may also be used to prepare microporous materials in accordance with the present invention. Additionally, fluorochemical additives should be selected that do not adversely affect the heterogeneous nucleation function of the nucleating agent, when such agents are employed.

Materials suitable as diluents for blending with the crystallizable polyolefin to make the microporous membrane materials useful in the present invention are liquids or solids which are not solvents for the crystallizable polymer at room temperature. However, at the melt temperature of the crystallizable polymer the compounds become good solvents for the polymer and dissolve it to form a homogeneous solution. The homogeneous solution is extruded through, for example, a film die, and on cooling to or below the crystallization temperature of the crystallizable polymer, the solution phase separates to form a phase-separated film. Preferably, these diluents have a boiling point at atmospheric pressure at least as high as the melting temperature of the polymer. However, diluents having lower boiling points may be used in those instances where superatmospheric pressure may be employed to elevate the boiling point of the compound to a temperature at least as high as the melting temperature of the polymer. Generally, suitable diluents have a solubility parameter and a hydrogen bonding parameter within a few units of the values of these same parameters for the polymer.

Some examples of blends of crystalline olefin polymers and diluent compounds which are useful in preparing microporous materials in accordance with the present invention include: polypropylene with mineral oil, dioctyl phthalate, petroleum jelly, wax or mineral spirits; polypropylene-polyethylene copolymer with mineral oil; polyethylene with mineral oil or mineral spirits; and mixtures and blends thereof. Typical blending ratios are 40 to 80 weight percent polymer and 20 to 60 weight percent processing compound.

A particular combination of polymer and processing compound may include more than one polymer, i.e., a mixture of two or more polymers, e.g., polypropylene and polybutylene, and/or more than one processing compound. Mineral oil and mineral spirits, which are substantially non-volatile at ambient conditions, are examples of mixtures of processing compounds, since they are typically blends of hydrocarbon liquids. Similarly, blends of liquids and solids may also serve as the processing compound. Hydrocarbons suitable for use include both liquids and solids. The liquids are generally mixtures of various molecular weights and with increasing weight become more viscous, i.e., light to heavy mineral oils having a carbon chain length of at least about 20, and with increasing molecular weight become gels, such as petroleum jelly, and then solids, such as waxes having a carbon chain length of about 36.

The microporous article or at least one microporous layer in a multilayer article may be prepared by melt-blending a polymer component, i.e. polymer or polymer mixture above described, to form a solution by heating the mixture with an diluent component at a temperature above the melting temperature of the polymer.

The microporous article may also contain other additive materials in limited quantity so as also not to interfere with the formation of the microporous article of the present invention, and so as not to result in unwanted exuding of the additive. Such additives may include anti-static materials, plasticizers, microbubbles, microspheres, UV absorbers, nucleating agents, hygroscopic metal salts, alkoxides, inorganic fillers and the like. The amount of total additive content is typically less than 10% of the weight of the polymeric mixture, preferably less than 6% by weight, and more preferably less than 2% by weight.

Inorganic particulate fillers which can be used are solid inorganic alkali earth metal salt particles which are nonhygroscopic, light-colored, water insoluble, easily pulverized, finely divided, and have densities below about 3 g/cc and melting points above olefin degradation temperatures. Particularly preferred is calcium carbonate, although other inorganic salts may be used such as, for example, alkali- or alkaline earth metal carbonates and sulfates, particularly magnesium carbonate, calcium sulfate and barium sulfate.

The melt solution is prepared by mixing the polymer component, the diluent component, and the fluorochemical additive under agitation such as that provided by an extruder and heating until the temperature of the mixture is above the liquid-solid phase separation temperature. At this point the mixture becomes a melt solution or single phase. Once the melt solution is prepared, a shaped article is then formed by known methods, for example, employing an extruder.

The preferred article according to the present invention is in the form of a sheet or film although other article shapes are contemplated. For example, the article may be in the form of a tube or filament. Other shapes which can be made according to the disclosed process are also intended to be within the disclosed invention.

Cooling of the shaped article occurs either in the extruder, at or near the die at the extruder discharge, or preferably by casting the shaped material onto a casting wheel. The microporous films of the present invention are typically cooled by casting on a smooth or patterned drum. Cooling causes the phase transition to occur between the diluent and the polymer components. This occurs by crystallization precipitation of the polymer component to form a network of polymer domains.

The shaped article (e.g. the oil-in cast film) is nonporous at this stage and is rendered microporous by orientation (stretching). The stretching is at least in one direction to separate adjacent crystallized polymer domains from one another to provide a network of interconnected micropores. Stretching may be achieved by pulling the films with either a length orienter and/or tenter (i.e. orienting down-web, cross-web or both). When the film is pulled in more than one direction, the degree of stretch may be the same or different in each direction.

An extruder with either a blown film die or a cast film die and a casting wheel can be used to initiate the thermal phase separation process as described above. These resulting films can be stretch oriented in either a uniaxial or biaxial manner to yield a microporous film. Further, the oriented films may be annealed or heat-set to retain the orientation imparted. These microporous films are both porous and breathable as demonstrated by air-flow/Gurley values in the range of 5 to 1000 sec/50 cc and moisture vapor transmission rates (MVTR's) in the range of 2,000 to 8,000 $g/m^2/day$ (when measured with the upright cup method at 40° C. and 50% relative humidity). The films are thus suitable for many breathable garment and barrier film applications.

Although not preferred, the process may further comprise a diluent removal step to remove all or part of the diluent component. This may lead to removal of part of the fluorochemical additive. The removal of diluent may be carried out by extraction, displacement or other known methods. Any suitable solvent or displacement agent that is additionally a non-solvent for the polymer component and is preferably a non-solvent for the fluorochemical additive as well may remove the diluent component. If diluent removal is desired, it is preferable to displace the diluent with the fluorochemical additive, or with a solution or dispersion comprising the fluorochemical additive. Further, any additive removed during a diluent removal step may be replaced by imbibing the microporous article with additional fluorochemical additive. By this method an oil-out microporous film containing fluorochemical additive and generally less than 10 wt. % diluent can be prepared.

The process may further include a bonding step whereby the microporous film is bonded to one or more additional layers that may comprise a web, such as a film, scrim, fabric or other substrate, that may be porous or nonporous. Bonding may be accomplished by any means known to the art including heat-sealing, ultrasonic welding, heat and/or pressure lamination or adhesives. Preferably the bonding step comprises a lamination step whereby the microporous film and the web are pressed together in a nip between rollers and heated sufficiently to soften either the microporous film or additional layer. The lamination apparatus may comprise, for example, a first smooth roller and second roller having an embossing pattern. The bonding of the microporous film to a web may improve mechanical properties, such as tear resistance or transverse strength, of the microporous article and render it more suitable for use as fluid barrier films used in home and building construction, and medical or other protective garments.

The microporous article of the present invention may contain at least one layer of the above-described microporous material with at least one additional porous or non-porous layer. By way of example, in a three-layer system the above-described microporous layer is preferably the center layer sandwiched by, i.e., in between additional porous or non-porous layers. The additional layers of a multilayer article may include non-woven fabrics scrims or webs, woven fabrics or scrims, porous film, and non-porous film. Such materials may be bonded or laminated to the microporous film by, for example, pressing the microporous film and the web together in a nip between a smooth roll and a second roll (preferably having an embossing pattern on its surface) and heated sufficiently to soften the material facing the metal roll. Other bonding means such as are know in the art may also be used. Alternatively materials may be laminated by means of adhesives such as pressure-sensitive or hot-melt adhesives.

Multilayer microporous films of the present invention can be prepared directly by coextrusion. The microporous film may be formed by extrusion (or coextrusion for a multilayer article) followed by cooling to cause phase transition and then orientation to form a porous film structure. The temperatures and other process conditions depend on the type of materials used and the properties desired from each layer, and are known or readily determined by those in the art. The coextrusion may employ a feedblock or a multi-manifold die at the extruder discharge. Cooling may be effected by casting the multi-layer film onto a casting wheel or drum. In addition, the multi-layers film can be made by lamination means. Multilayer films comprising at least one fluorochemical additive containing microporous layer may be prepared using a variety of equipment and a number of melt-processing techniques (typically, extrusion techniques) well known in the art. Such equipment and techniques are disclosed, for example, in U.S. Pat. No. 3,565,985 (Schrenk et al.), U.S. Pat. No. 5,427,842 (Bland et al.), U.S. Pat. No. 5,589,122 (Leonard et al.), U.S. Pat. No. 5,599,602 (Leonard et al.), and U.S. Pat. No. 5,660,922 (Herridge et al.). For example, single- or multi-manifold dies, full moon feedblocks (such as those described in U.S. Pat. No. 5,389,324 to Lewis et al.), or other types of melt processing equipment can be used, depending on the number of layers desired and the types of materials extruded.

For example, one technique for manufacturing multilayer films of the present invention can use a coextrusion technique, such as that described in U.S. Pat. No. 5,660,922 (Herridge et al.). In a coextrusion technique, various molten streams are transported to an extrusion die outlet and joined together in proximity of the outlet. Extruders are in effect the "pumps" for delivery of the molten streams to the extrusion die. The particular extruder is generally not critical to the process. A number of useful extruders are known and include single and twin screw extruders, batch-off extruders, and the like. Conventional extruders are commercially available from a variety of vendors such as Davis-Standard Extruders, Inc. (Pawcatuck, Conn.), Black Clawson Co. (Fulton, N.Y.), Berstorff Corp. (Ky.), Farrel Corp. (Conn.), and Moriyama Mfr. Works, Ltd. (Osaka, Japan).

The microporous articles of the present invention are useful in a variety of light management applications such as diffuse reflectors. For example, they may be used as a back reflector in liquid crystal display (LCD) and light emitting diode (LED) backlight constructions. The diffuse reflective materials of the present invention may also be used to increase the brightness of sign cabinets, light fibers, and light conduits. The light diffusing article may be used to partially line an optical cavity to increase the efficient use of light to illuminate such things as, for example, a partially transparent image that may be either static (such as a graphics film or a transparency) or switchable (such as a liquid crystal display). Thus, optical cavities that are partially lined with diffuse reflector films of the invention may be used in such devices as backlight units such as liquid crystal display constructions (LCDs), lights, copying machines, projection system displays, facsimile apparatus, electronic blackboards, diffuse light standards, and photographic lights. They may also be part of a sign cabinet system, a light conduit or units containing light emitting diodes (LEDs).

Thus, for example, the diffuse reflective article of the present invention has been found to be especially beneficial as a back reflector in commercial back lights used for liquid crystal displays. In this type of application, the film is placed directly behind the light source which is illuminating a display. The porous film simply acts to reflect back all the light which is not directed toward the display and ultimately a viewer. The scattering or diffuse reflection characteristics of the porous film back reflector also helps provide a more overall diffuse light source and more evenly lit display, and are suitable as diffuse reflector and polarization randomizers as described in Patent Application Publication No. WO 95/17699 and U.S. Pat. No. 6,111,696.

The unique morphology resulting from diffuse reflectors made via the solid/liquid process is particularly useful in making a practical reflector having high diffuse reflection. The morphology of the solid medium has small dimensions because it is formed by phase separating a polymer and a diluent from a solution. The articles have solid and air regions (or void spaces) of a particular size and comprise materials that do not absorb radiation in the wavelength desired to be diffusely reflected. Thus, for the diffuse reflection of visible light, 380–730 nanometers, the polymer materials preferred are, for example, polyolefins such as polypropylene, polyethylene; copolymers of ethylene and vinyl acetate, or compatible mixtures thereof. Also, because diluent and additive may be present in varying amounts, they should also be non-absorbing.

The viral barrier, liquid repellent, moisture vapor and air permeable, microporous membrane materials useful in the present invention repel aqueous based fluids as well as a variety of other liquids, such as perspiration which contains oil-based components, and prevent penetration of the liquids through the thin (5 to 250 microns) membrane, even when the liquid is propelled against the membrane material. The microporous membrane materials, while fluid repellent, also have very high moisture vapor permeabilities coupled with significant air permeability properties.

Garments fabricated from the microporous membrane materials useful in the present invention allow for the transfer of moisture vapor resulting from perspiration through the garment at a rate sufficient to maintain the skin of the wearer in a reasonably dry state under normal use conditions. The microporous membrane materials useful in the present invention differ from prior art single layer microporous liquid repellent, moisture vapor permeable materials in that they are not subject to contamination by perspiration residues that reduce and ultimately destroy the repellency properties of the material. This difference allows the membrane materials useful in the present invention to be used in garment applications without a protective overlayer.

The microporous membranes used in the surgical gowns and drapes of the invention may also be laminated or layered with other porous materials such as woven cloth, non-woven fabric such as non-woven scrim, or foam material. The use of such additional materials should preferably not affect prevention of viral pathogen transmission or porosity.

The articles provided by the present invention include surgical gowns, drapes, masks, gloves, sterile wraps, wound dressings and waste disposal bags, and descriptions of such articles are found, for example, in U.S. Pat. No. 3,856,005 (Sislian); U.S. Pat. No. 4,976,274 (Hanssen); U.S. Pat. No. 4,845,779 (Wheeler et al.); U.S. Pat. No. 3,911,499 (Benevento et al.); U.S. Pat. No. 4,920,960 (Hubbard et al.); U.S. Pat. No. 4,419,993 (Petersen); U.S. Pat. No. 3,426,754 (Bierenbaum et al.); U.S. Pat. No. 4,515,841 (Dyke); UK Application No. 2,232,905A (Woodcock).

The microporous membrane materials useful in the present invention exhibit durability of their liquid repellency properties when subjected to sterilization, rubbing, touching, folding, flexing or abrasive contacts. The microporous membrane materials useful in the present invention also display oleophobic properties, resisting penetration by oils and greases and they are heat sealable when thermoplastic. The oleophobicity and heat sealing properties of the membrane materials prepared by phase separation are most surprising in that the membrane materials contain an oily, oleophilic processing compound which, a priori, one would expect, would promote wetting by other oleophilic materials and which also would inhibit heat sealing.

Transport of a liquid challenge through most porous materials or fabrics occurs because the liquid is able to wet the material. The likely route through the material is for the liquid to initially wet the surface of the material and to subsequently enter the pore openings at the surface of the material followed by a progressive wetting of and travel through the interconnected pores until finally reaching the opposite surface of the material. If the liquid has difficulty wetting the material, liquid penetration into and through the material will, for the most, be reduced. The similar phenomena occurs in the pores, where reduced wettability, in turn, reduces pore invasion. The greater the numerical difference between the liquid surface tension of the liquid and the surface energy of the porous material (the latter being lower), the less likely the liquid will wet the porous material.

The addition of a fluorochemical additive to the microporous membrane useful in the present invention reduces the surface energy of the membrane, thereby increasing the numerical difference between its surface energy and the surface tension of challenge liquids. It is also expected that additional oil and water repellent fluorochemical compositions would also provide viral barrier properties when added during extrusion at the proper extrusion conditions or when topically applied. Preferably, the fluorochemical additive is soluble in the polymer or processing compound in the molten state.

The oleophobic, hydrophobic, moisture vapor permeable, air permeable, viral barrier, heat sealable, microporous membrane materials useful in the present invention preferably comprise a polymeric microporous membrane having a matrix of pores comprising continuous passages extending through the thickness of the membrane and opening into the opposite surfaces of the membrane. The polymer used to prepare the microporous membrane useful in the present invention preferably contains a fluorochemical additive which migrates to an air interface, thereby lowering the surface energy of the faces of the membrane as well as the walls of the pores in the membrane, and enhancing the hydrophobic properties of the microporous membrane as well as rendering the microporous membrane material oleophobic.

The microporous membrane materials useful in the present invention can be tailored to have moisture vapor permeability rates over a broad range without adversely impacting their water repellencies, but it is preferable to have a moisture vapor transmission rate (MVTR) of at least 1000 $g/m^2/24$ hrs., more preferably a MVTR of at least 2000 $g/m^2/24$ hrs., and most preferably a MVTR of at least 5000 $g/m^2/24$ hrs (when measured using the upright cup method at 40° C. and 50% relative humidity).

In the following non-limiting examples, all parts and percentages are by weight unless otherwise indicated. In evaluating the materials of the invention and the comparative materials, the following test methods are used.

EXAMPLES

Porosity Test Method

Porosity was measured according to ASTM-D726-58 Method A and is reported in Gurley seconds/50 cc Time to Repel Oil Test Method A drop of mineral oil was carefully placed on the surface of the microporous fabric. Time is recorded when the drop of oil is absorbed into the fabric.

Repellency Test Method

A drop of the liquid to be tested was carefully placed on the surface of the microporous fabric. A no rating indicates that the liquid wet the fabric 10 minutes or less; a yes rating indicates the fluid did not wet the fabric for at least 10 minutes.

Visual Fluid Barrier Test Method

ASTM F1670-97

Viral Barrier Test Method

ASTM F1671-97

Glossary Table

| Designator | Material Description | Material Availability |
|---|---|---|
| Citric Acid | $HOC(CO_2H)(CH_2CO_2H)_2$ | Sigma-Aldrich, Milwaukee, WI |

-continued

| Designator | Material Description | Material Availability |
|---|---|---|
| FC-350 | $C_4F_9SO_2N(CH_3)CH_2CH_2OOC$—<br>$C_4F_9SO_2N(CH_3)CH_2CH_2OOC$—$\rangle$—OH<br>$CH_3(CH_2)nOOC$—<br>where $n_{avg}$ = 25 | See preparation below |
| FC-425 | $C_4F_9SO_2N(CH_3)CH_2CH_2OOC$—<br>$C_4F_9SO_2N(CH_3)CH_2CH_2OOC$—$\rangle$—OH<br>$CH_3(CH_2)nOOC$—<br>where $n_{avg}$ = 30 | See preparation below |
| FC-1 | [Structure: $C_8F_{17}SO_2$–N(CH$_3$)–CH$_2$– pyrrolidinone with N–$C_{18}H_{37}$] | Can be prepared as described in U.S. Pat. No. 5,025,052 Ex 1, substituting octadecyl isocyanate for mxylylene diisocyanate |
| MeFBSE | $C_4F_9SO_2N(CH_3)CH_2CH_2OH$ | Can be prepared as described in WO 01/30873 (Savu et al. Ex. 2 Part A) |
| p-toluene sulfonic acid | $p\text{-}CH_3(C_6H_4)SO_3H$ | Sigma-Aldrich |
| ROUNDUP ™ | Glyphosate, isopropylamine salt | Monsanto, St. Louis, MO |
| SPAN ™-20 | Sorbitan monolaurate | ICI Surfactants, Cleveland, UK |
| TWEEN ™-80 | Polyoxyethylene (20) sorbitan monooleate | ICI Surfactants |
| UNILIN-350 | Polyethylene alcohol; $n_{avg}$ = 25<br>121.7 —OH equiv. wt | Baker Petrolite, Tulsa, OK |
| UNILIN-425 | Polyethylene alcohol; $n_{avg}$ = 30<br>105.0 —OH equiv. wt | Baker Petrolite |

Preparation of FC-350

A 5 L round bottom flask fitted with a heating mantle and Dean-Stark trap was charged with toluene (700 g), citric acid (150 g; 0.7806 moles), MEFBSE (557.8 g; 1.56 moles), UNILIN™-350 (359.8 g; 0.78 moles), and p-toluene sulfonic acid (0.4 wt %). The ensuing mixture was heated at reflux (118° C.) for 15 hours. When the desired amount of water was collected in the Dean-Stark trap, the toluene was distilled off, first by raising the temperature to 150° C. and eventually to 170° C. when most of the toluene was distilled off the molten product was poured into a pan and allowed to dry in the oven at 120° C. for 4 hrs.

Preparation of FC-425

The preparation described for FC-350 was followed with the exception that UNILIN™-350 was replaced with UNILIN™-425 (417.6 g; 0.78 moles)

Preparation of Microporous Fabric

The following examples were made with 0.6 dg/min melt flow index polypropylene (5D45; 0.6 melt flow index; available from Union Carbide, Danbury Conn.), USP White Mineral Oil #31 (available from AMOCO Oil Co.), 55° C. melting Histowax (available from MCB Manufacturing Chemists, Inc), C.I. 15:3 blue copper phthalocyanine pigment (available from Sima-Aldrich), and FC-compounds amounts and types as listed in Table 1.

Examples C1 and C2 and Examples 1–8

For the examples listed in Table 1 the materials to be included (polypropylene, mineral oil, HISTOWAX™, and/or fluorochemical additive) were melt mixed in a 40 mm twin-screw extruder operated at 5.08 kg/hr, 200 rpm screw speed, and 210° C. melt temperature. The extrudate was formed into a 0.76 mm thick sheet through a 38.1 cm×0.0381 cm orifice onto a chill wheel maintained at 66° C. During quenching, the polymer phase separates from the mineral oil and fluorochemical additive into sub-micron size spherulites around the pigment that acts as a nucleating agent. The cast film was stretched 1.5×1.5 at 116° C.

Table 1 contains the mineral oil, fluorochemical additive wt % loading and the Gurley second value to pass 50 cc of air through the porous film and the time for mineral oil to penetrate the through the thickness of the film. The polypropylene and blue pigment concentrations were held constant at 62.5 and 1.0 wt % respectively.

Example 9

A microporous fabric was made from a polypropylene, mineral oil, blue pigment, FC-425 formulation similar to Example 6, except the FC-425 level was 1.8 wt % and in the extrusion process the material was processed at 118 kg/hr on a 60 mm twin screw extruder and the stretch ratio was 1.7×1.7. The finished film thickness was 30.5 microns. The film was inline laminated to a 1.0 oz PP spunbond web made by BBA Nonwovens, Simpsonville S.C., Protective Fabrics Division, using a thermal bonding process at 47 m/minute. In the table "FC" refers to the fluorochemical additive

TABLE 1

| Example | Type of FC | Oil wt % | FC wt % | Wax wt % | Gurley sec/50 cc | Time to repel oil |
|---------|-----------|----------|---------|----------|------------------|-------------------|
| C-1     | —         | 36.5     | 0       | 0        | 45               | 0 sec             |
| C-2     | FC-1      | 33.5     | 1.5     | —        | 80               | 2 days            |
| 1       | FC-350    | 34.5     | 2.0     | —        | 40               | 0 sec             |
| 2       | FC-350    | 34.0     | 2.5     | —        | 28               | 1 hour            |
| 3       | FC-350    | 29.0     | 2.5     | 5.0      | 33               | 12 hours          |
| 4       | FC-350    | 33.5     | 3.0     | —        | 41               | 3 days            |
| 5       | FC-350    | 33.0     | 3.5     | —        | 47               | 14 days           |
| 6       | FC-425    | 34.5     | 2.0     | —        | 30               | 12 hours          |
| 7       | FC-425    | 34.0     | 2.5     | —        | 42               | 3 days            |
| 8       | FC-425    | 33.5     | 3.0     | —        | 46               | >7 days           |
| 9*      | FC-425    | 34.7     | 1.8     | —        | 160              | 6 days            |

*The film/fabric passed ASTM F1670-97 (visual fluid barrier) and ASTM F1671-97 (viral barrier) tests.

Examples where FC-350 was added at ≧2.5 wt % (Examples 2–5) exhibited improved time to repel oil over Comparative Example C-1 and FC-350 added at 2 wt % (Example 1). The addition of Histowax at 5.0 wt % with FC-350 at 2.5 wt % (Example 3) exhibited improved time to repel oil over addition of FC-350 at 2.5 wt % (Example 2). All levels of FC-425 (Examples 6–9) exhibited improved time to repel oil versus Comparative Example C-1

Table 2 lists the repellency values of three microporous fabrics against several materials. Repellency values generally indicate that fluorochemical additives significantly increased the repellency values of the microporous fabric when compared against Comparative Example C-1.

TABLE 2

| Ex # | Water | Sweat | Mineral oil | (ROUND UP ™) | SPAN ™ 20 | TWEEN ™ 80 | 80/20 IPA/water |
|------|-------|-------|-------------|--------------|-----------|------------|------------------|
| C-1  | Yes   | No    | No          | No           | No        | No         | No               |
| 2    | Yes   | Yes   | Yes         | Yes          | Yes       | Yes        | Yes              |
| 7    | Yes   | Yes   | Yes         | Yes          | Yes       | Yes        | Yes              |
| 9    | Yes   | Yes   | Yes         | Yes          | Yes       | Yes        | Yes              |

We claim:

1. A microporous article comprising:
   (a) a crystallizable olefin polymer component; and
   (b) a fluorochemical additive, which is the reaction product of one or more polyfunctional compounds having reactive hydroxy and/or acyl functional groups, and having from 3 to 12 carbon atoms; with one or more monofunctional fluorochemical compounds of the formula $R_fQZ$;

wherein $R_f$ is a fluoroalkyl group having 3 to 12 carbon atoms,
Q is a divalent linking group, and
Z is a co-reactive hydroxyl group or acyl group that reacts with the corresponding reactive group of said polyfunctional compound; and
one or more aliphatic monofunctional compounds of the formula $R_hZ$, wherein $R_h$ is an aliphatic group having from 12 to 72 carbon atoms, and 
Z is a co-reactive hydroxyl group or acyl group that reacts with the corresponding reactive group of said polyfunctional compound.

2. The microporous article of claim 1 further comprising a diluent component, said diluent component being miscible with the polymer component at a temperature above the liquid-solid phase separation temperature and able to phase separate from the polymer component through crystallization separation upon cooling below the liquid-solid phase separation temperature.

3. The microporous article of claim 2 comprising:
   (a) about 40 to 80 parts by weight of said crystallizable olefin polymer component;
   (b) about 20 to 60 parts by weight of said diluent component,; and
   (c) at least about 0.5 parts by weight of said fluorochemical additive.

4. The microporous article of claim 1, wherein the amount of said monofunctional fluorochemical compound $R_fQZ$ is sufficient to react with at least 25% of the available reaction functional groups of said polyfunctional compound and the amount of said aliphatic monofunctional compound $R_hZ$ is sufficient to react with at least 25% of the available reaction functional groups of said polyfunctional compound.

5. The microporous article of claim 1, wherein said fluorochemical additive is of the formula:

$$[R_h(CO_2)]_m\text{—}A\text{—}[(CO_2)\text{—}QR_f]_n$$

wherein A is the residue of a polyol or polyacid optionally having one or more unreacted hydroxyl or carboxyl functional groups, 
$R_h$ is an alkyl group of 12 to 72 carbon atoms,
$R_f$ a fluoroalkyl group having 3 to 12 carbon atoms,
Q is a divalent linking group,
each $(CO_2)$ group is non-directional, and
m and n are each at least 1.

6. The microporous article of claim 1 wherein said fluorochemical additive is of the formula:

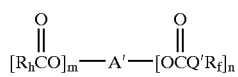

wherein A' is the residue of a polyol, optionally having one or more unreacted hydroxyl or carboxyl functional groups,
$R_h$ is an alkyl group of 12 to 72 carbon atoms,
$R_f$ is a fluoroalkyl group of 3 to 12 carbon atoms,
Q' is a divalent linking group, and
m and n are each at least 1.

7. The microporous article of claim 1 wherein said fluorochemical additive is of the formula:

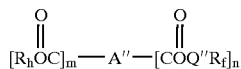

wherein A" is the residue of a polyacid optionally having one or more unreacted hydroxyl or carboxyl functional groups, $R_h$ is an alkyl group of 12 to 72 carbon atoms, $R_f$ is a fluoroalkyl group having 3 to 12 carbon atoms, Q" is a divalent linking group, and m and n are each at least 1.

8. The microporous article of claim 7 wherein m is 1 to 2, n is 1 to 2 and m+n is about 3.

9. The fluorochemical additive of claim 5, $R_f$ has 3 to 6 carbon atoms, n is at least 1.5, m+n is 3 and Q is —SO$_2$NR$_1$'(CH$_2$)$_k$—, wherein k is from 2 to 11, and R$_1$' is hydrogen, or alkyl of 1 to about 4 carbon atoms.

10. A multilayer microporous film comprising at least one layer of a microporous material according to claim 1.

11. The multilayer film of claim 10 further comprising at least one additional layer selected from the group consisting of non-woven fabric, woven fabric, porous film, and non-porous film.

12. The article of claim 1 wherein the polymer component is a polyolefin, a polyolefin copolymers, a polyolefin blend or a mixture thereof.

13. The article of claim 12, wherein the polyolefin is polypropylene, high density polyethylene, or copolymers of propylene and ethylene.

14. The article of claim 1 wherein said microporous membrane has a moisture vapor transmission rate of at least 2000 g/m$^2$/24 hours when measured at 40° C. and 50% relative humidity.

15. The article of claim 1 wherein the fluorochemical additive comprises about 1 to 10 weight percent of the article.

16. The article of claim 1 wherein the fluorochemical additive comprises about 1 to 5 weight percent of the article.

17. The article of claim 1 further comprising said microporous membrane material being layered with at least one porous material which does not generally affect prevention of viral pathogen transmission.

18. The article of claim 1 further comprising said microporous membrane material being layered with at least one porous material which does not generally affect the porosity of said microporous membrane.

19. The article of claim 2 wherein said diluent is selected from the group consisting of alkyl phthalate, mineral oil; mineral spirits; petroleum jelly, waxes and mixtures and blends thereof.

20. The article of claim 1 comprising a first phase of polymer spherulites inconnected with polymer fibrils creating a network of interconnected micropores, and a second phase comprising the diluent component and fluorochemical additive at least partially coating said spherulites and fibrils.

21. The microporous article of claim 2 wherein said polymer and said diluent are selected from the group consisting of polypropylene with mineral oil, dioctyl phthalate, petroleum jelly, wax or mineral spirits; polypropylene-polyethylene copolymer with mineral oil; polyethylene with mineral oil or mineral spirits and mixtures and blends thereof.

22. The microporous article of claim 1 further comprising an inorganic filler.

23. The microporous article of claim 22 wherein said inorganic filler is selected from the group consisting of alkali- or alkaline earth metal carbonates and sulfates.

24. The microporous article of claim 3 comprising 35 to 60 parts by weight of diluent component.

25. The microporous article of claim 3 comprising 65 to 80 parts by weight of polymer component.

26. The microporous article of claim 3 comprising 1 to 10 parts by weight of fluorochemical additive.

27. The microporous article of claim 3 comprising at least 15 weight percent fluorine.

28. A protective garment comprising the microporous article of claim 1.

29. A barrier membrane comprising the microporous article of claim 1.

30. The microporous article of claim 3, further comprising 0.05 to 5 parts by weight of a nucleating agent.

31. The microporous article of claim 1, wherein said polyfunctional compound is citric acid or derivative thereof.

* * * * *

UNITED STATES PATENT AND TRADEMARK OFFICE
CERTIFICATE OF CORRECTION

PATENT NO. : 6,858,290 B2  Page 1 of 2
APPLICATION NO. : 10/159752
DATED : February 22, 2005
INVENTOR(S) : James S. Mrozinski It is certified that error appears in the above-identified patent and that said Letters Patent is hereby corrected as shown below:

Title Page, Col. 1, U. S. PATENT DOCUMENTS
Line 1, delete "3,429,745 A" and insert -- 3,426,745 A --, therefor.

Col. 2
Line 49, delete "scalable" and insert -- sealable --, therefor.

Col. 7
Line 55, delete "—CONHR$_1$'(CH$_2$)$_K$O(O)C—" and insert
-- —CONR$_1$'(CH$_2$)$_K$O(O)C— --, therefor.

Col. 19, Designator
After "FC-1", delete

"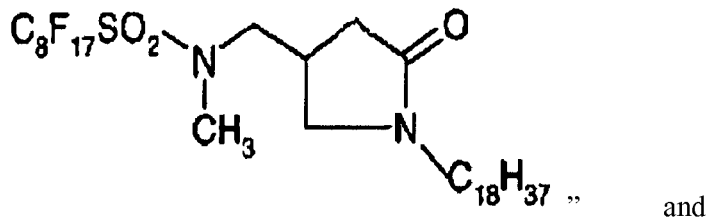 and insert --

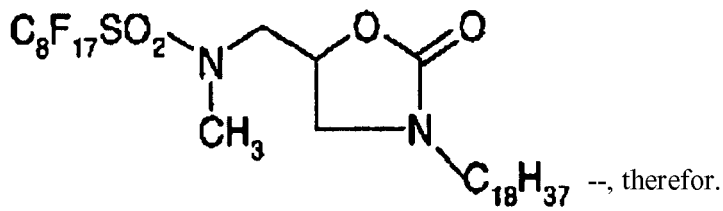 --, therefor.

UNITED STATES PATENT AND TRADEMARK OFFICE
CERTIFICATE OF CORRECTION

PATENT NO. : 6,858,290 B2
APPLICATION NO. : 10/159752
DATED : February 22, 2005
INVENTOR(S) : James S. Mrozinski It is certified that error appears in the above-identified patent and that said Letters Patent is hereby corrected as shown below:

Col. 19, Material Availability
After the chemical structure for "FC-1", delete "mxylylene" and insert
-- m-xylylene --, therefor.

Col. 19
Line 50, delete "when" and insert -- When --, therefor.

Col. 22
Line 15, in Claim 3, delete "component,;" and insert -- component; --, therefor.

Signed and Sealed this

Eighteenth Day of March, 2008

JON W. DUDAS
*Director of the United States Patent and Trademark Office*